United States Patent
Folke et al.

(10) Patent No.: US 12,513,709 B2
(45) Date of Patent: Dec. 30, 2025

(54) TRANSMISSION PROFILES FOR NR

(71) Applicant: TELEFONAKTIEBOLAGET LM ERICSSON (PUBL), Stockholm (SE)

(72) Inventors: Mats Folke, Vallingby (SE); Stefan Parkvall, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 5 days.

(21) Appl. No.: 18/367,621

(22) Filed: Sep. 13, 2023

(65) Prior Publication Data

US 2023/0422263 A1 Dec. 28, 2023

Related U.S. Application Data

(63) Continuation of application No. 16/227,303, filed on Dec. 20, 2018, now Pat. No. 11,805,527, which is a continuation of application No. PCT/IB2018/082805, filed on Apr. 23, 2018.

(60) Provisional application No. 62/489,093, filed on Apr. 24, 2017.

(51) Int. Cl.
*H04W 72/23* (2023.01)
*H04W 72/566* (2023.01)

(52) U.S. Cl.
CPC ......... *H04W 72/23* (2023.01); *H04W 72/569* (2023.01)

(58) Field of Classification Search
None
See application file for complete search history.

(56) References Cited

U.S. PATENT DOCUMENTS

| | | | |
|---|---|---|---|
| 11,805,527 B2* | 10/2023 | Folke | H04W 72/569 |
| 2018/0092122 A1* | 3/2018 | Babaei | H04L 1/1822 |
| 2018/0270839 A1 | 9/2018 | Loehr | |
| 2018/0279358 A1 | 9/2018 | Babaei et al. | |
| 2018/0302918 A1 | 10/2018 | Shaheen | |
| 2018/0368156 A1* | 12/2018 | Agiwal | H04W 72/20 |
| 2019/0335448 A1* | 10/2019 | Yang | H04W 72/51 |
| 2019/0364586 A1* | 11/2019 | Li | H04W 72/23 |
| 2020/0037345 A1* | 1/2020 | Ryoo | H04W 74/0833 |
| 2020/0127787 A1 | 4/2020 | Nory | |

FOREIGN PATENT DOCUMENTS

| | | |
|---|---|---|
| EP | 2244514 A1 | 10/2010 |
| EP | 3616459 B1 | 6/2022 |
| KR | 20170026294 A | 3/2017 |
| RU | 2571954 C2 | 12/2015 |

(Continued)

OTHER PUBLICATIONS

Ericsson, "Impacts on the UL grant and LCP of different numerologies and flexible TTI", 3GPP TSG-RAN WG2 #96, R2-168659, Nov. 14-18, 2016, Reno, USA.

(Continued)

*Primary Examiner* — Mohammad S Adhami

(57) ABSTRACT

According to certain embodiments, a method by a wireless device is provided for performing logical channel prioritization (LCP) by a wireless device. The method includes selecting a set of logical channels based on one or more logical channel restrictions. The method further includes determining at least one logical channel of the set of logical channels to serve.

8 Claims, 10 Drawing Sheets

(56) References Cited

FOREIGN PATENT DOCUMENTS

WO     2016163660 A1    10/2016
WO     2018229736 A1    12/2018

OTHER PUBLICATIONS

Interdigital Communications, "Logical Channel Prioritization for NR", 3GPP TSG-RAN WG2 #97bis, R2-1702871, Apr. 3-7, 2017, Spokane, USA.

Qualcomm Incorporated, "Logical channel prioritization in NR with multiple numerologies/TTIs." 3GPP TSG RAN WG2 3 Meeting #97bis, R2-17xxxx, Spokane, USA Apr. 3-7, 2017.

* cited by examiner

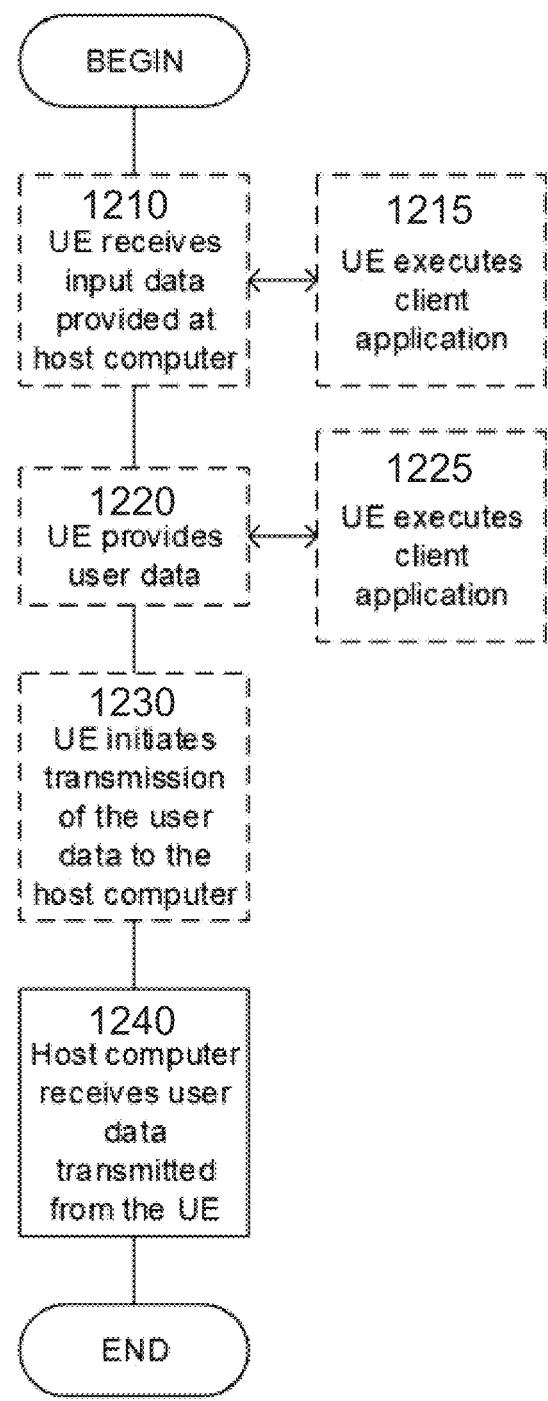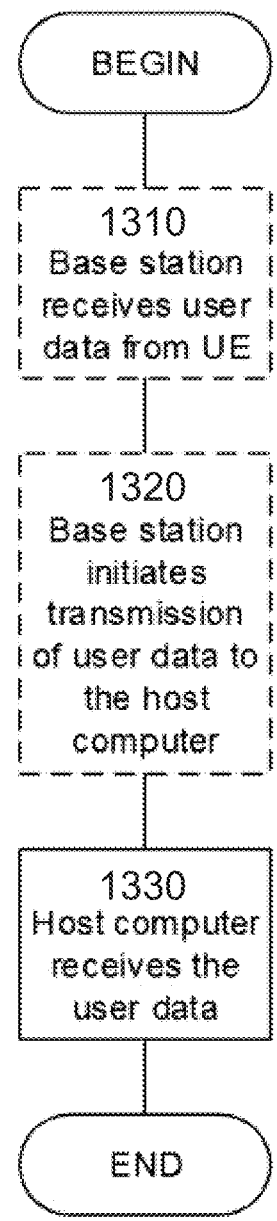
FIGURE 12
FIGURE 13

TRANSMISSION PROFILES FOR NR

RELATED APPLICATIONS

This application is a Continuation of U.S. application Ser. No. 16/227,303, filed on Dec. 20, 2018, which is a Continuation of International Patent Application PCT/IB2018/052805, filed Apr. 23, 2018, which claims the benefit of U.S. Provisional Application No. 62/489,093, filed Apr. 24, 2017 and entitled "Transmission Profiles For NR," the disclosures of which are all hereby incorporated by reference.

TECHNICAL FIELD

The present disclosure relates, in general, to wireless communications and, more particularly, systems and methods for performing logical channel prioritization (LCP) for NR.

BACKGROUND

NR is the new 5G radio access technology currently undergoing standardization in 3GPP. It features a wide range of frequencies and encompasses a wide range of services.

The wide range of services to support means that the physical layer can be configured to for example support:
- services requiring very low latency (e.g., Ultra-Reliable Low Latency Communications, URLLC), possibly at the expense of power consumption
- services maximizing the bit rate (e.g., Enhanced Mobile Broadband, eMBB) without caring so much of the latency.

There could also be other services, or subclasses of the above services. Different service types will be mapped to different logical channels according to their requirements, though the NR specification may not use terms like eMBB and URLLC.

One of the functions of the MAC sublayer is multiplexing of logical channels to one MAC protocol data unit (MAC PDU) which is passed to the physical layer for transmission. This is done by a process called logical channel prioritization (LCP). The various services of the system are represented as logical channels to the MAC sublayer, hence LCP must take the current configuration of the physical layer into consideration to ensure that the Quality of Service of the services is fulfilled.

In the downlink and where the scheduler and MAC multiplexing reside in the same node, the gNodeB can handle the multiplexing of logical channels and setting the physical layer parameters in an implementation-specific manner and no specification impact is foreseen.

In the uplink and possibly the side link, where the scheduler and MAC resides in different nodes, the scheduling grant received by the user equipment (UE) contains some of the physical-layer parameters such as, for example, modulation-and-coding schemes, and the set of resource blocks to transmit upon, while the multiplexing of logical channels is done according to a predefined rule identifying which parameters can be configured by RRC signaling. For each logical channel in an LTE device, a prioritized data rate is configured in addition to the priority value. The logical channels are then served in decreasing priority order up to their prioritized data rate, which avoids starvation as long as the scheduled data rate is at least as large as the sum of the prioritized data rates. Beyond the prioritized data rates, channels are served in strict priority order until the grant is fully exploited or the buffer is empty. For example, FIG. 1 illustrates the prioritization of two logical channels for three different uplink grants.

Certain challenges exist, however, since current approaches fail to provide the LCP function with enough information to perform the multiplexing that fulfills Quality of Service requirements.

SUMMARY

To address the foregoing problems with existing solutions, methods and apparatuses are disclosed to help determine which logical channels are served. Specifically, a user equipment (UE) and associated methods are disclosed. Additionally, a network node (e.g., gNB) and associated methods are also disclosed.

According to certain embodiments, a method by a wireless device is provided for performing logical channel prioritization (LCP) by a wireless device. The method includes determining a set of logical channels associated with a transmission profile and, based on the transmission profile, determining at least one logical channel of the set of logical channels to serve.

According to certain embodiments, a wireless device is provided for performing LCP. The wireless device includes processing circuitry operable to determine a set of logical channels associated with a transmission profile and, based on the transmission profile, determine at least one logical channel of the set of logical channels to serve.

According to certain embodiments, a method for performing LCP by a network node is provided. The method includes associating a set of logical channels with a transmission profile for prioritizing serving of logical channels by a wireless device and configuring the wireless device to serve the set of logical channels based on the transmission profile.

According to certain embodiments, a network node for performing LCP is provided. The network node includes processing circuitry operable to associate a set of logical channels with a transmission profile for prioritizing serving of logical channels by a wireless device and configure the wireless device to serve the set of logical channels based on the transmission profile.

Certain embodiments of the present disclosure may provide one or more technical advantages. For example, certain embodiments may enable the MAC layer to serve logical channels on physical configurations such that the QoS requirements of the services can be fulfilled. Certain embodiments may have none, some, or all the recited advantages. Other advantages may be readily apparent to one having skill in the art. Certain embodiments may have none, some, or all the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 12 illustrates a method implemented in a communication system, according to certain embodiments; and FIG. 13 illustrates another method implemented in a communication system, according to certain embodiments.

DETAILED DESCRIPTION

Figure 1:
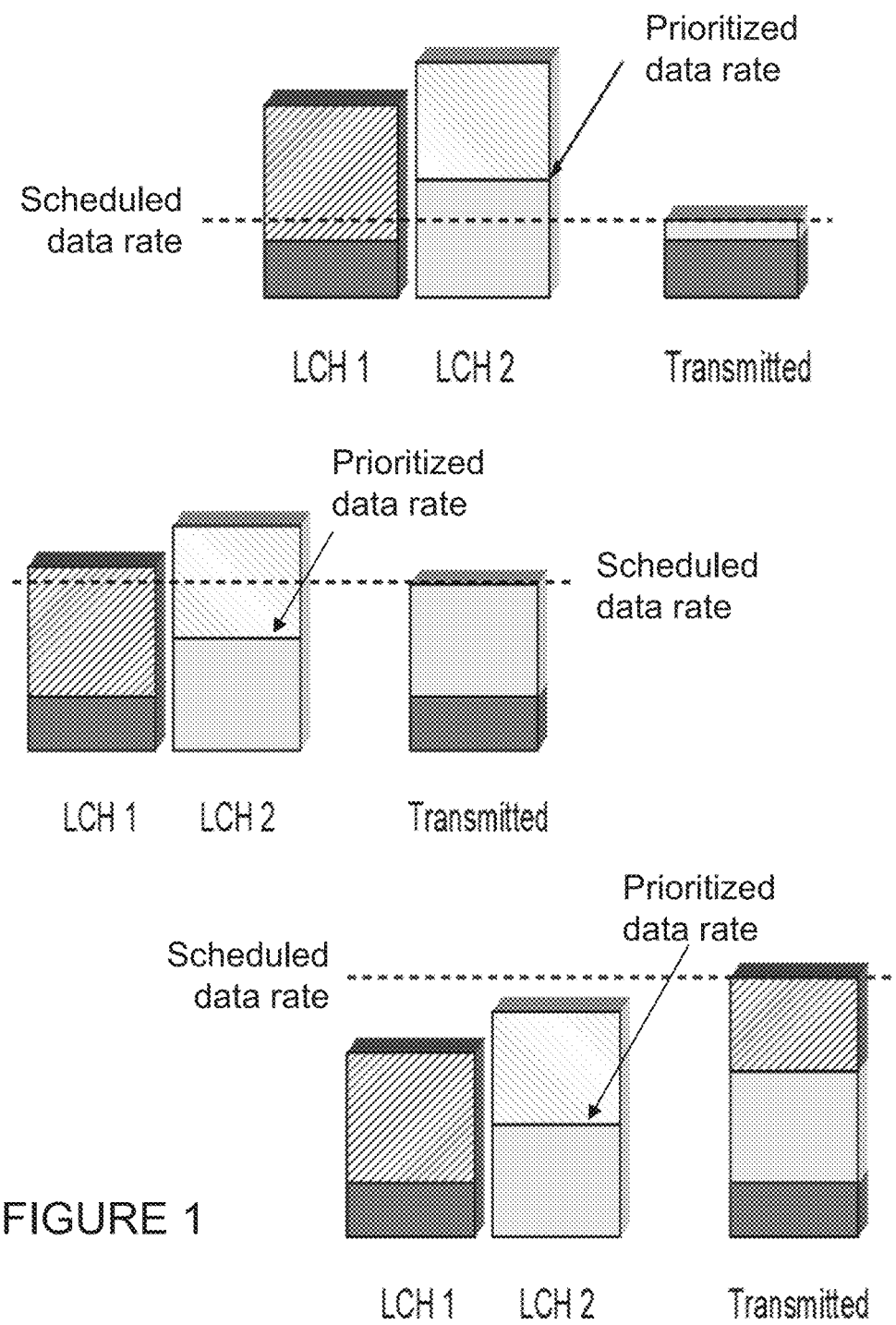
FIG. 1 illustrates the prioritization of two logical channels for three different uplink grant.

Particular embodiments are described in FIGS. 1-13 of the drawings, like numerals being used for like and corresponding parts of the various drawings.

According to certain embodiments, a transmission profile is introduced to inform a wireless device how to multiplex logical channels (LCHs) and some layer 1 (L1) parameters for a transmission. The scheduling grant includes information identifying which of the preconfigured transmission profiles that the wireless device is to use for the uplink transmission.

According to certain embodiments, each transmission profile may be associated with a priority where transmissions scheduled with a higher priority may preempt ongoing uplink transmissions of a lower priority. In various particular embodiments, the transmission profile may describe the configuration of the physical layer, for example, in terms of one or more of the following:
- an index (or identifier), unique for this transmission profile;
- transmission power;
- duration of the transmission on the physical layer in terms of, for example, slots and/or OFDM symbols;
- numerology such as, for example, subcarrier spacing;
- a priority level or preemption indicator;
- parameters controlling the multiplexing of LCHs such as, for example, guaranteed bit rates for the different LCHs, indications of which LCHs are allowed to be transmitted with a profile, etc.;
- power boosting (e.g., 0 dB, X dB, Y dB extra power relative to the nominal transmission power); and
- other suitable parameters relating to the physical layer.

However, the items listed above are used for exemplary, non-limiting purposes. It will be appreciated that they may be combined in any suitable fashion, and other factors, mappings, or restrictions may also be used to describe the physical layer in the transmission profile. Additionally, though the term logical control channel (LCH) is used throughout this document, the term is used as an example implementation. The solutions described herein could also be applied to groups of logical channels. Thus, the term 'LCH' may be replaced with 'LCH group' throughout the disclosure.

According to certain embodiments, a network node, which may include a gNodeB (gNB) in a particular embodiment, configures a wireless device, which may include a user equipment (UE), with one or several transmission profiles. Using the index of the transmission profile, the transmission profile can be easily referred to. According to certain embodiments, a default transmission profile can also be provided by the network (or predefined in the specifications).

According to certain embodiments, the priority level or preemption indicator may be used to determine which transmissions are allowed to preempt an ongoing transmission. For example, a scheduling grant pointing to a transmission profile with a higher priority level may be allowed to preempt an ongoing transmission with a lower priority level. In a particular embodiment, the index may also be used directly. For example, a predefined relation between index and priority may be used to let transmission profiles with a higher index preempt transmissions scheduled with a lower transmission profile index.

Figure 2:
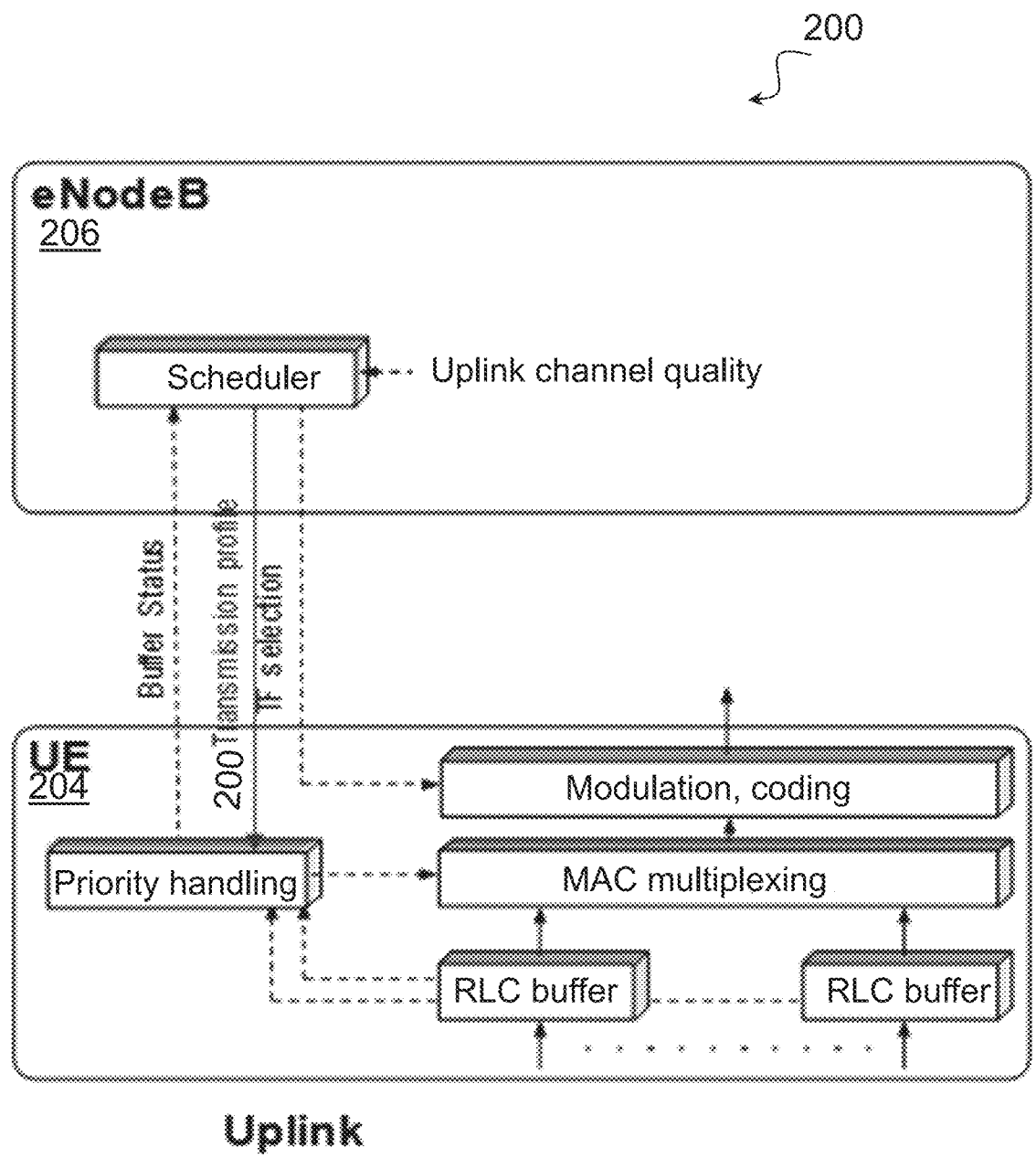
FIG. 2 illustrates using a transmission profile for performing logical channel prioritization (LCP) in an LTE framework, according to certain embodiments.

FIG. 2 illustrates using a transmission profile for performing logical channel prioritization (LCP), expanding on an LTE framework 200, according to certain embodiments. Existing LTE signaling is shown with dashed lines. New transmission profile signaling 202 for "TF selection" in NR is shown with a solid line. In a particular embodiment, the transmission profile signaling may be a part of the scheduling grant.

In addition to the resource allocation, modulation scheme, etc., which may be termed 'transmission format', the scheduling grant may also include a 'transmission profile index'.

According to certain embodiments, an association may be established between a logical channel and transmission profiles. For example, there may be a mapping between transmission profile and logical channel. A logical channel can be served by one or more transmission profiles and a transmission profile can serve one or more logical channels.

According to certain embodiments, the mapping may be done in at least two different ways:
  The configuration of the transmission profile contains a list of logical channels, identified by their respective logical channel ID
    Additionally, for each logical channel a priority may be included which describes in which order the channels are served when scheduled with this transmission profile.
    Additionally, for each logical channel a prioritized bit rate may be included which describes the bit rate the channel shall be served with this transmission profile.
  The configuration of the logical channel contains a list of transmission profiles, identified by their respective transmission profile index, which can be further described:
    The list of transmission profiles contains one or more transmission profile index(es).
    The list of transmission profiles is empty or is excluded which means that the logical channel can be served using any transmission profile configured in the UE.
    The list of transmission profiles is empty or excluded which means that the logical channel can be served using the default transmission profile provided.
    Additionally, for each entry in the list of transmission profile a priority is included which describes in which order the channel is served when scheduled with this transmission profile.

Additionally, for each logical channel a prioritized bit rate is included which describes the bit rate the channel shall be served with this transmission profile.

However, it is generally recognized that the two primary methods of mapping described above are used for illustrative purposes. It will be appreciated that the various sub-elements thereof may be combined in any suitable manner.

With regard to the indication of the transmission profile to wireless device 204, according to certain embodiments, the network node (e.g., gNB) 206 may determine the configuration of the physical layer and hence the transmission profile. In a particular embodiment, wireless device 204 may be configured with a transmission profile for each transmission the wireless device 204 performs. The transmission profile can be conveyed to wireless device 204 in a number of ways, including, for example:

The dynamic grant includes the transmission profile index. This is not necessarily limited to an uplink grant, and can apply to, e.g., sidelink grants.

The network node (gNB) 205 configures the UE 204 to use a certain transmission profile for all future transmissions, or until reconfigured.

The network node (gNB) 205 configures the UE 204 to use a certain transmission profile for a subset of all future transmissions (e.g. through association subframe number with transmission profile), or until reconfigured. According to certain embodiments, this could correspond to Semi-Persistent Scheduling (SPS).

The transmission profile to use is given by the amount of data awaiting transmission on different LCHs. For example, whenever there is data on a high priority LCH a transmission profile prioritizing that transmission and a power offset could be used.

The transmission profile to use is given by how long the data has been awaiting transmission on different LCHs. For example, if the age of the data is coming close to a predefined deadline, a transmission profile prioritizing that transmission and a power offset could be used.

These various methods of conveying/indicating a transmission profile to UE 204 are provided as illustrative examples. It will be appreciated that these methods may be combined in any suitable manner.

According to certain embodiments, the UE would perform the LCP using the transmission profiles. Input may include:

Transmission profile for the upcoming transmission, called T

A set of logical channels with associations to transmission profiles

An example of how the LCP can be performed follows:

Step 1: The UE determines a set of logical channels which can be served by transmission profile T, e.g., whether T is included in the logical channel configuration.

Step 2: From the set of logical channels determined in step 1, the UE determines which logical channels to serve (i.e. from which logical channels to take SDUs and put in the MAC PDU) taking into account the channel-specific priority and/or prioritized bit rate.

Figure 3:
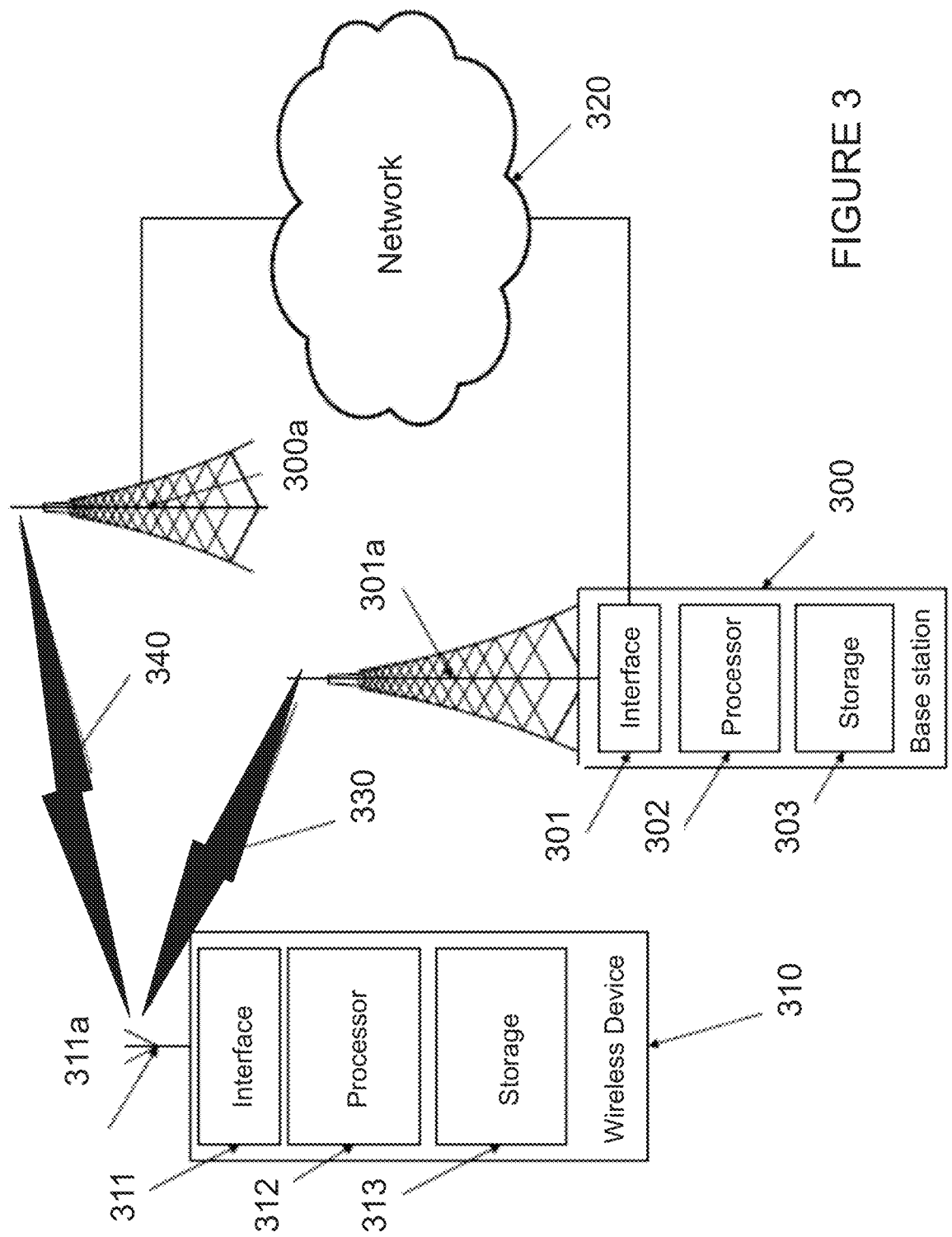
FIG. 3 illustrates an exemplary wireless communication network in which LCP may be performed, in accordance with certain embodiments.

As discussed above, the solutions described herein may be implemented in any appropriate type of system using any suitable components. FIG. 3 illustrates an exemplary wireless communication network in which LCP may be performed, in accordance with certain embodiments. In the depicted example embodiment of FIG. 3, the wireless communication network provides communication and other types of services to one or more wireless devices 310. In the illustrated embodiment, the wireless communication network includes one or more instances of network nodes 300 that facilitate the wireless devices' access to and/or use of the services provided by the wireless communication network. The wireless communication network may further include any additional elements suitable to support communication between wireless devices or between a wireless device 310 and another communication device, such as a landline telephone.

Network 320 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 3 illustrates a wireless network comprising a more detailed view of network node 300 and wireless device 310, in accordance with a particular embodiment. For simplicity, FIG. 3 only depicts network 320, network nodes 300 and 300*a*, and wireless device 310. Network node 300 comprises processor 302, storage 303, interface 301, and antenna 301*a*. Similarly, wireless device 310 comprises processor 312, storage 313, interface 311 and antenna 311*a*. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device 310 and/or with other equipment in the wireless communication network that enable and/or provide wireless access to the wireless device 310. Examples of network nodes 300 include, but are not limited to, access points (APs), in particular radio access points. A network node 300 may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes 300 include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes 300 may represent any suitable device (or group of devices) capable, configured, arranged, and/or operable to enable and/or provide a wireless device access to the wireless communication network or to provide some service to a wireless device 310 that has accessed the wireless communication network.

As used herein, the term "radio node" is used generically to refer both to wireless 310 devices and network nodes 300, as each is respectively described above.

As stated above, FIG. 3 depicts network node 300 as comprising processor 302, storage 303, interface 301, and antenna 301a. These components are depicted as single boxes located within a single larger box. In practice however, a network node 300 may comprise multiple different physical components that make up a single illustrated component (e.g., interface 301 may comprise terminals for coupling wires for a wired connection and a radio transceiver for a wireless connection). As another example, network node 300 may be a virtual network node in which multiple different physically separate components interact to provide the functionality of network node 300 (e.g., processor 302 may comprise three separate processors located in three separate enclosures, where each processor is responsible for a different function for a particular instance of network node 300). Similarly, network node 300 may be composed of multiple physically separate components (e.g., a NodeB component and a RNC component, a BTS component and a BSC component, etc.), which may each have their own respective processor, storage, and interface components. In certain scenarios in which network node 300 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 300 may be configured to support multiple radio access technologies (RATs). In such embodiments, some components may be duplicated (e.g., separate storage 303 for the different RATs) and some components may be reused (e.g., the same antenna 301a may be shared by the RATs).

Processor 302 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 300 components, such as storage 303, network node 300 functionality. For example, processor 302 may execute instructions stored in storage 303. Such functionality may include providing various wireless features discussed herein to a wireless device, such as wireless device 310, including any of the features or benefits disclosed herein.

Storage 303 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 303 may store any suitable instructions, data or information, including software and encoded logic, utilized by network node 300. Storage 303 may be used to store any calculations made by processor 302 and/or any data received via interface 301.

Network node 300 also comprises interface 301 which may be used in the wired or wireless communication of signaling and/or data between network node 300, network 320, and/or wireless device 310. For example, interface 301 may perform any formatting, coding, or translating that may be needed to allow network node 300 to send and receive data from network 320 over a wired connection. Interface 301 may also include a radio transmitter and/or receiver that may be coupled to or a part of antenna 301a. The radio may receive digital data that is to be sent out to other network nodes or wireless devices via a wireless connection. The radio may convert the digital data into a radio signal having the appropriate channel and bandwidth parameters. The radio signal may then be transmitted via antenna 301a to the appropriate recipient (e.g., wireless device 310).

Antenna 301a may be any type of antenna capable of transmitting and receiving data and/or signals wirelessly. In some embodiments, antenna 301a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" refers to a device capable, configured, arranged and/or operable to communicate wirelessly with network nodes 300 and/or another wireless device 310. Communicating wirelessly may involve transmitting and/or receiving wireless signals using electromagnetic signals, radio waves, infrared signals, and/or other types of signals suitable for conveying information through air. In particular embodiments, wireless devices 310 may be configured to transmit and/or receive information without direct human interaction. For instance, a wireless device 310 may be designed to transmit information to a network on a predetermined schedule, when triggered by an internal or external event, or in response to requests from the network. Generally, a wireless device 310 may represent any device capable of, configured for, arranged for, and/or operable for wireless communication, for example radio communication devices. Examples of wireless devices 310 include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device 310 may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device 310 may support device-to-device (D2D) communication, for example by implementing a 3GPP standard for sidelink communication and may in this case be referred to as a D2D communication device.

As yet another specific example, in an Internet of Things (IoT) scenario, a wireless device 310 may represent a machine or other device that performs monitoring and/or measurements and transmits the results of such monitoring and/or measurements to another wireless device and/or a network node. The wireless device 310 may in this case be a machine-to-machine (M2M) device, which may in a 3GPP context be referred to as a machine-type communication (MTC) device. As one particular example, the wireless device 310 may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device 310 as described above may represent the endpoint of a wireless connection, in which case the device may be referred to as a wireless terminal. Furthermore, a wireless device 310 as described above may be mobile, in which case it may also be referred to as a mobile device or a mobile terminal.

As depicted in FIG. 3, wireless device 310 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 300 and/or other wireless devices. Wireless device 310 comprises processor 312, storage 313, interface 311, and antenna 311a. Like network node 300, the components of wireless device 310 are depicted as single boxes located within a single larger box, however in practice a wireless device may comprises multiple different physical components that make up a single illustrated component (e.g., storage 313 may comprise multiple discrete microchips, each microchip representing a portion of the total storage capacity).

Processor 312 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 310 components, such as storage 313, wireless device 310 functionality. Such functionality may include providing various wireless features discussed herein, including any of the features or benefits disclosed herein.

Storage 313 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 313 may store any suitable data, instructions, or information, including software and encoded logic, utilized by wireless device 310. Storage 313 may be used to store any calculations made by processor 312 and/or any data received via interface 311.

Interface 311 may be used in the wireless communication of signaling and/or data between wireless device 310 and network node 300. For example, interface 311 may perform any formatting, coding, or translating that may be needed to allow wireless device 310 to send and receive data from network node 300 over a wireless connection. Interface 311 may also include a radio transmitter and/or receiver that may be coupled to or a part of antenna 311a. The radio may receive digital data that is to be sent out to network node 301 via a wireless connection. The radio may convert the digital data into a radio signal having the appropriate channel and bandwidth parameters. The radio signal may then be transmitted via antenna 311a to network node 300.

Antenna 311a may be any type of antenna capable of transmitting and receiving data and/or signals wirelessly. In some embodiments, antenna 311a may comprise one or more omni-directional, sector or panel antennas operable to transmit/receive radio signals between 2 GHz and 66 GHz. For simplicity, antenna 311a may be considered a part of interface 311 to the extent that a wireless signal is being used.

Figure 4:
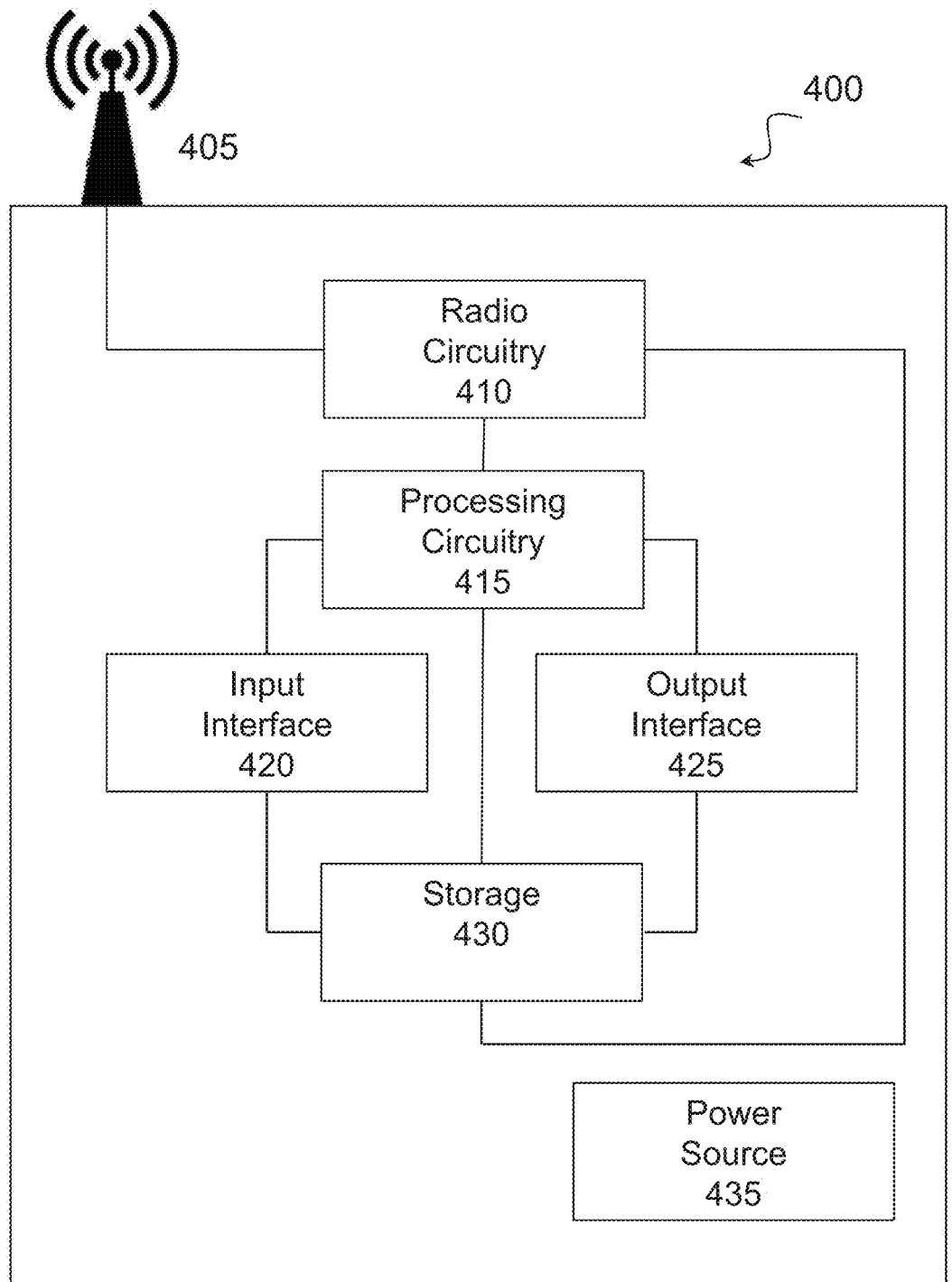
FIG. 4 illustrates an example user equipment (UE) for performing LCP, according to certain embodiments.

FIG. 4 illustrates an example UE for performing LCP, according to certain embodiments. As depicted, user equipment 400 is an example wireless device such as wireless device 310 in FIG. 3.

As depicted, UE 400 includes an antenna 405, radio front-end circuitry 410, processing circuitry 415, and a computer-readable storage medium 430. Antenna 405 may include one or more antennas or antenna arrays and is configured to send and/or receive wireless signals and is connected to radio front-end circuitry 410. In certain alternative embodiments, wireless device 400 may not include antenna 405, and antenna 405 may instead be separate from wireless device 400 and be connectable to wireless device 400 through an interface or port.

The radio front-end circuitry 410 may comprise various filters and amplifiers, is connected to antenna 405 and processing circuitry 415, and is configured to condition signals communicated between antenna 405 and processing circuitry 415. In certain alternative embodiments, wireless device 300 may not include radio front-end circuitry 410, and processing circuitry 415 may instead be connected to antenna 405 without radio front-end circuitry 410.

Processing circuitry 415 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 415 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 415 executing instructions stored on a computer-readable storage medium 430. In alternative embodiments, some or all of the functionality may be provided by the processing circuitry 415 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 415 alone or to other components of UE 400, but are enjoyed by the wireless device as a whole, and/or by end users and the wireless network generally.

Antenna 405, radio front-end circuitry 410, and/or processing circuitry 415 may be configured to perform any receiving operations described herein as being performed by a wireless device. Any information, data and/or signals may be received from a network node and/or another wireless device.

The processing circuitry 415 may be configured to perform any determining operations described herein as being performed by a wireless device. Determining as performed by processing circuitry 415 may include processing information obtained by the processing circuitry 415 by, for example, converting the obtained information into other information, comparing the obtained information or converted information to information stored in the wireless device, and/or performing one or more operations based on the obtained information or converted information, and as a result of said processing making a determination.

Antenna 405, radio front-end circuitry 410, and/or processing circuitry 415 may be configured to perform any transmitting operations described herein as being performed by a wireless device. Any information, data and/or signals may be transmitted to a network node and/or another wireless device.

Computer-readable storage medium 430 is generally operable to store instructions, such as a computer program, software, an application including one or more of logic, rules, code, tables, etc. and/or other instructions capable of being executed by a processor. Examples of computer-readable storage medium 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 415. In some embodiments, processing circuitry 415 and computer-readable storage medium 430 may be considered to be integrated.

Alternative embodiments of UE 400 may include additional components beyond those shown in FIG. 4 that may be responsible for providing certain aspects of the UE's functionality, including any of the functionality described herein and/or any functionality necessary to support the solution described above. As just one example, UE 400 may include input interfaces, devices and circuits, and output interfaces, devices and circuits. Input interfaces, devices, and circuits are configured to allow input of information into UE 400, and are connected to processing circuitry 415 to allow processing circuitry 415 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 400, and are connected to processing circuitry 415 to allow processing circuitry 415 to output information from UE 400. For example, output interfaces, devices, or circuits may include a speaker, a display, vibrating circuitry, a USB port, a headphone interface, or other output elements. Using one or more input and output interfaces, devices, and circuits, UE 400 may communicate with end users and/or the wireless network and allow them to benefit from the functionality described herein.

As another example, UE 400 may include power source 435. Power source 435 may comprise power management circuitry. Power source 435 may receive power from a power supply, which may either be comprised in, or be external to, power source 435. For example, UE 400 may comprise a power supply in the form of a battery or battery pack which is connected to, or integrated in, power source 435. Other types of power sources, such as photovoltaic devices, may also be used. As a further example, UE 400 may be connectable to an external power supply (such as an electricity outlet) via an input circuitry or interface such as an electrical cable, whereby the external power supply supplies power to power source 435. Power source 435 may be connected to radio front-end circuitry 410, processing circuitry 415, and/or computer-readable storage medium 430 and be configured to supply UE 400, including processing circuitry 415, with power for performing the functionality described herein.

UE 400 may also include multiple sets of processing circuitry 415, computer-readable storage medium 430, radio circuitry 410, and/or antenna 405 for different wireless technologies integrated into wireless device 400, such as, for example, GSM, WCDMA, LTE, NR, WiFi, or Bluetooth wireless technologies. These wireless technologies may be integrated into the same or different chipsets and other components within wireless device 400.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage 403 may comprise computer readable means on which a computer program can be stored. The computer program may include instructions which cause processor 402 (and any operatively coupled entities and devices, such as interface 401 and storage 403) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 412 and/or 402, possibly in cooperation with storage 413 and/or 403. Processors 412 and/or 402 and storage 413 and/or 403 may thus be arranged to allow processors 412 and/or 402 to fetch instructions from storage 413 and/or 403 and execute the fetched instructions to allow the respective functional module to perform any steps or functions disclosed herein.

Figure 5:
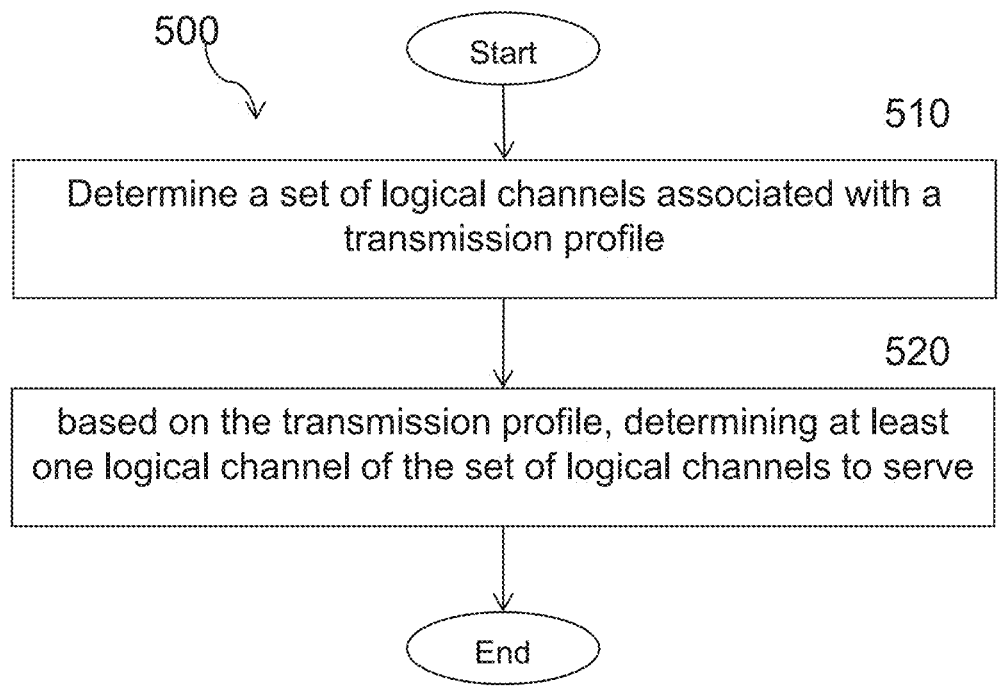
FIG. 5 illustrates an exemplary method by a wireless device for performing LCP, in accordance with certain embodiments.

FIG. 5 illustrates an exemplary method 500 by a wireless device 400 for performing LCP, in accordance with certain embodiments. The method begins at step 510 when wireless device 400 determines a set of logical channels associated with a transmission profile. According to certain embodiments, the transmission profile may be received in a scheduling grant from a network node.

In a particular embodiment, the transmission profile may identify a duration for the at least one logical channel of the set of logical channels to be served by wireless device 400. The duration may be measured as at least one of a number of slots and a number of Orthogonal Frequency Division Multiplexing (OFDM). In another embodiment, the transmission profile may identify a subcarrier spacing for the at least one logical channel of the set of logical channels to be served by wireless device 400.

At step 520, wireless device 400 determines at least one logical channel of the set of logical channels to serve based on the transmission profile. In a particular embodiment, for example, wireless device 400 may prioritize the at least one logical channel of the set of logical channels over at least one logical channel not included in the set of logical channels. Additionally, in a particular embodiment, wireless device, may determine that the transmission profile is included in a logical channel configuration. The logical channel configuration may identify a transmission profile to be applied to a particular logical channel within the set of logical channels.

In a particular embodiment, the transmission profile includes a list of logical channel identifiers that uniquely identify a particular one of the set of logical channels. Wireless device 400 may determine the at least one logical channel of the set of logical channels to serve based on the transmission profile by determining that a logical channel identifier associated with the at least one logical channel is included in the list of logical channel identifiers in the transmission profile.

In a particular embodiment, the transmission profile may include a channel-specific priority for each logical channel in the set of logical channels and a prioritized bit rate for each logical channel in the set of logical channels.

In a particular embodiment, wireless device 400 may also be configured to serve the at least one of the set of logical channels.

Figure 6:
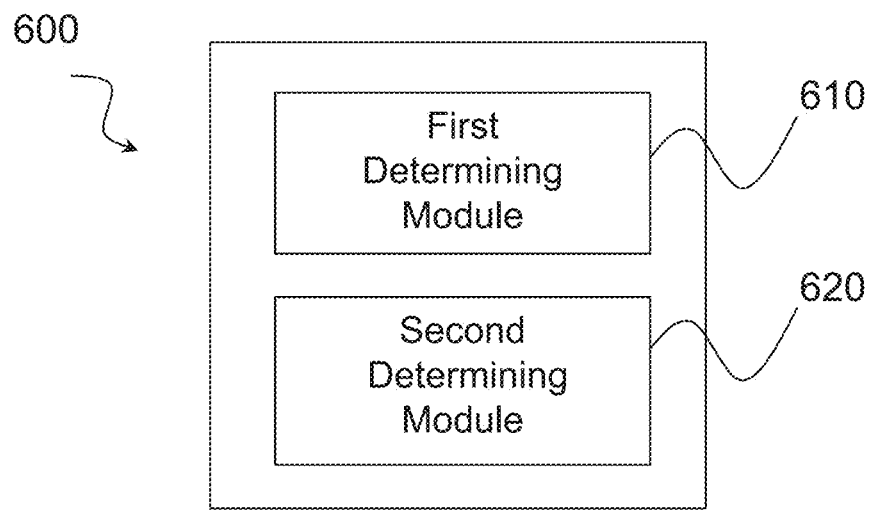
FIG. 6 illustrates an exemplary virtual computing device for performing LCP, in accordance with certain embodiments.

In certain embodiments, the method for performing LCP as described above may be performed by a computer networking virtual apparatus. FIG. 6 illustrates an example virtual computing device 600 for performing LCP, according to certain embodiments. In certain embodiments, virtual computing device 600 may include modules for performing steps similar to those described above with regard to the method illustrated and described in FIG. 5. For example, virtual computing device 600 may include a first determining module 610, a second determining module 620, and any other suitable modules for performing LCP. In some embodiments, one or more of the modules may be implemented using processing circuitry 415 of FIG. 4. In certain embodiments, the functions of two or more of the various modules may be combined into a single module.

The first determining module 610 may perform certain of the determining functions of virtual computing device 600. For example, in a particular embodiment, first determining module 610 may determine a set of logical channels associated with a transmission profile.

The second determining module 620 may perform certain other of the determining functions of virtual computing device 600. For example, in a particular embodiment, second determining module 620 may determine at least one logical channel of the set of logical channels to serve based on the transmission profile.

Other embodiments of virtual computing device 600 may include additional components beyond those shown in FIG. 6 that may be responsible for providing certain aspects of the wireless device's functionality, including any of the functionality described above and/or any additional functionality (including any functionality necessary to support the solutions described above). The various different types of wireless devices 400 may include components having the same physical hardware but configured (e.g., via programming) to support different radio access technologies, or may represent partly or entirely different physical components.

Figure 7:
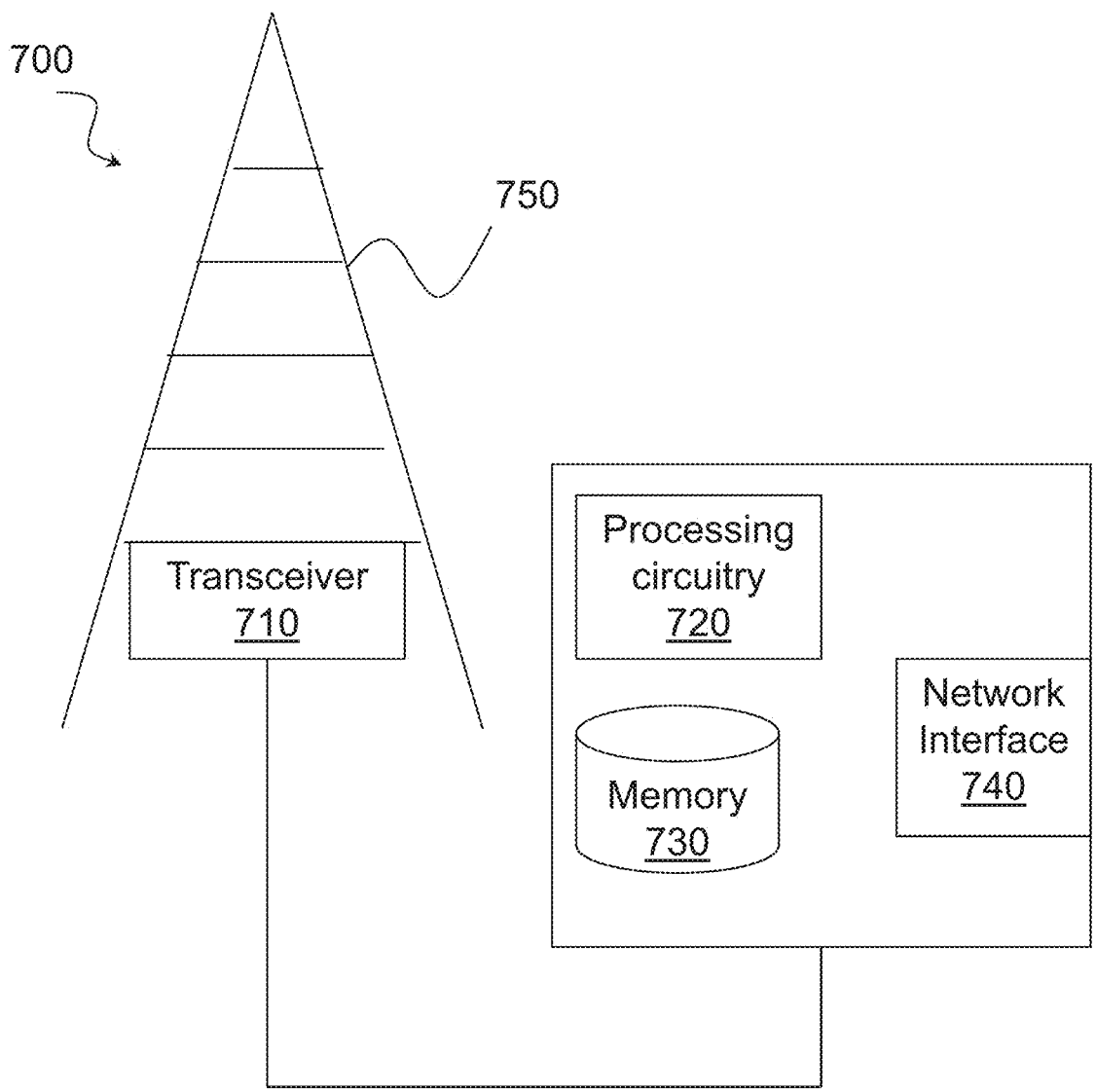
FIG. 7 illustrate an example network node for performing LCP, according to certain embodiments.

FIG. 7 illustrate an example network node 700 for performing LCP, according to certain embodiments. As depicted, network node 700 is another example network node such as network node 300 in FIG. 3. Generally, network node 700 may be any type of radio network node or any network node that communicates with a wireless device and/or with another network node.

Network nodes 700 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 700 may include one or more of transceiver 710, processor 720, memory 730, and network interface 740. In some embodiments, transceiver 710 facilitates transmitting wireless signals to and receiving wireless signals from wireless device 310 and/or UE 400 (e.g., via an antenna 750), processor 720 executes instructions to provide some or all of the functionality described above as being provided by a network node 700, memory 730 stores the instructions executed by processor 720, and network interface 740 communicates signals to backend network components, such as a gateway, switch, router, Internet, Public Switched Telephone Network (PSTN), core network nodes or radio network controllers, etc.

In certain embodiments, network node 700 may be capable of using multi-antenna techniques and may be equipped with multiple antennas and capable of supporting MIMO techniques. The one or more antennas may have controllable polarization. In other words, each element may have two co-located sub elements with different polarizations (e.g., 90-degree separation as in cross-polarization), so that different sets of beamforming weights will give the emitted wave different polarization.

Processor 720 may include any suitable combination of hardware and software implemented in one or more modules to execute instructions and manipulate data to perform some or all of the described functions of network node 700. In some embodiments, processor 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processor 720 and may refer to any suitable device operable to receive input for network node 700, send output from network node 700, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of network node 700 may include additional components beyond those shown in FIG. 7 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 8:
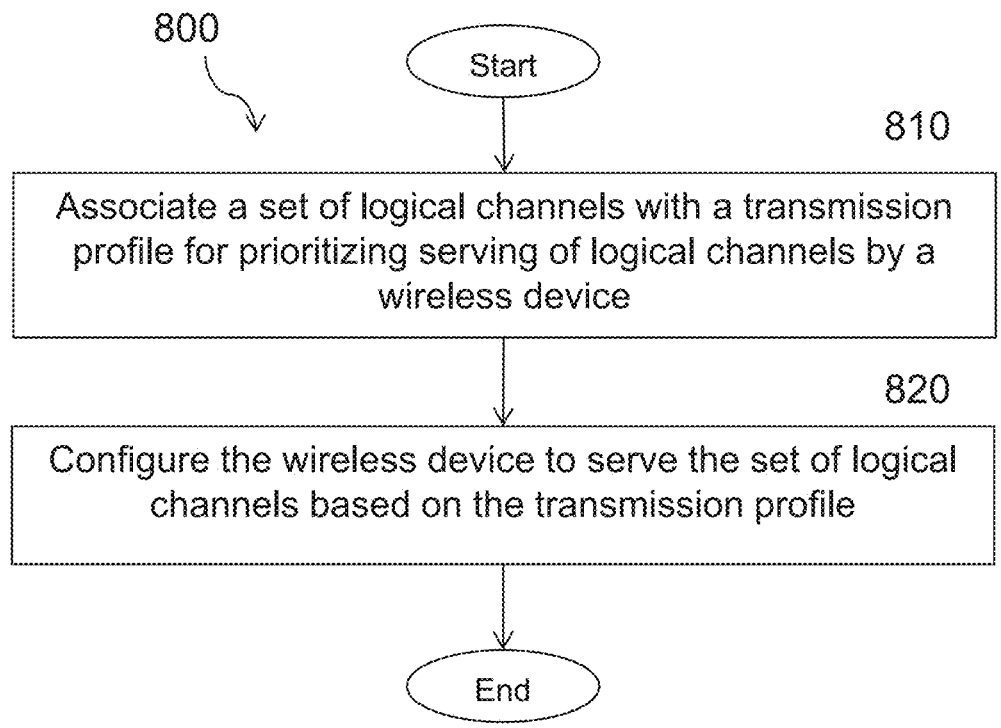
FIG. 8 illustrates an example method by a network node for performing LCP, according to certain embodiments.

FIG. 8 illustrates an example method 800 by a network node 700 for performing LCP, according to certain embodiments. The method begins at step 810 when network node 700 associates a set of logical channels with a transmission profile for prioritizing serving of logical channels by a wireless device 400. In a particular embodiment, the transmission profile includes a channel-specific priority for each logical channel in the set of logical channels and a prioritized bit rate for each logical channel in the set of logical channels. In another embodiment, the transmission profile may include a list of logical channel identifiers that uniquely identify a particular one of the set of logical channels. 18. In yet another embodiment, the transmission profile may additionally or alternatively include a subcarrier spacing for the at least one logical channel of the set of logical channels to be served by the wireless device.

At step 820, network node 700 configures wireless device 400 to serve the set of logical channels based on the transmission profile. In a particular embodiment, for example, network node 700 may transmit the transmission profile to the wireless device. In a particular embodiment, the transmission profile may be included in a scheduling grant transmitted to wireless device 400. In a particular embodiment, the transmission profile may identify a duration for the at least one logical channel of the set of logical channels to be served by the wireless device.

In another embodiment, a logical channel configuration may be transmitted to wireless device 400. The logical channel configuration may identify an association between the transmission profile and the set of logical channels. Network node 700 may determine the channel-specific priority of each logical channel in the set of logical channels based on a type of service or application associated with each respective logical channel.

In a particular embodiment, network node 700 may also receive, from wireless device 400, uplink data served on at least one logical channel within the set of logical channels. The at least one logical channel within the set of logical channels may be prioritized over at least one logical channel not included in the set of logical channels based on the at least one transmission profile.

Figure 9:
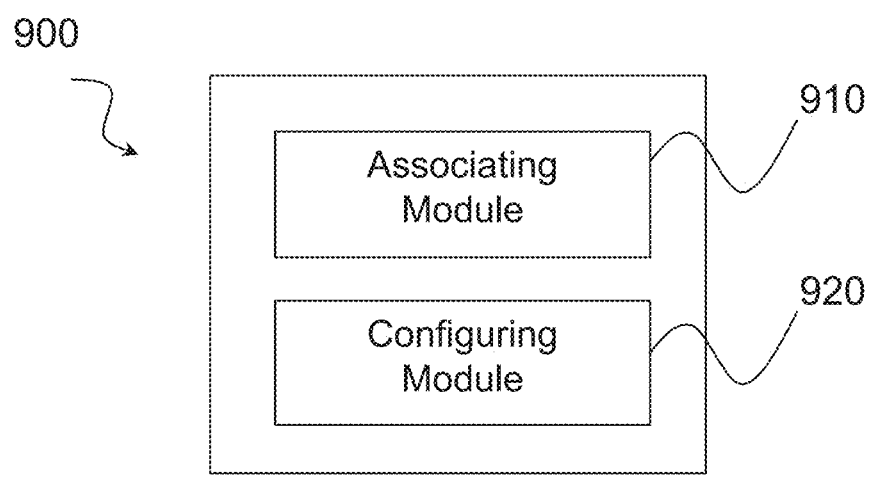
FIG. 9 illustrates another example virtual computing device for performing LCP, according to certain embodiments.

In certain embodiments, the method for performing LCP as described above may be performed by a computer networking virtual apparatus. FIG. 9 illustrates an example virtual computing device 900 for performing LCP, according to certain embodiments. In certain embodiments, virtual computing device 900 may include modules for performing steps similar to those described above with regard to the method illustrated and described in FIG. 8. For example, virtual computing device 900 may include at least one associating module 910, a configuring module 920, and any other suitable modules for performing LCP. In some embodiments, one or more of the modules may be implemented processing circuitry 720 of FIG. 7. In certain embodiments, the functions of two or more of the various modules may be combined into a single module.

The associating module 910 may perform the associating functions of virtual computing device 900. For example, in a particular embodiment, associating module 910 may associate a set of logical channels with a transmission profile for prioritizing serving of logical channels by a wireless device 400.

The configuring module 920 may perform the configuring functions of virtual computing device 900. For example, in a particular embodiment, configuring module 920 may configure wireless device 400 to serve the set of logical channels based on the transmission profile.

Other embodiments of virtual computing device 900 may include additional components beyond those shown in FIG. 9 that may be responsible for providing certain aspects of the network node's 115 functionality, including any of the functionality described above and/or any additional functionality (including any functionality necessary to support the solutions described above). The various different types of network nodes 115 may include components having the same physical hardware but configured (e.g., via programming) to support different radio access technologies, or may represent partly or entirely different physical components.

Figure 10:
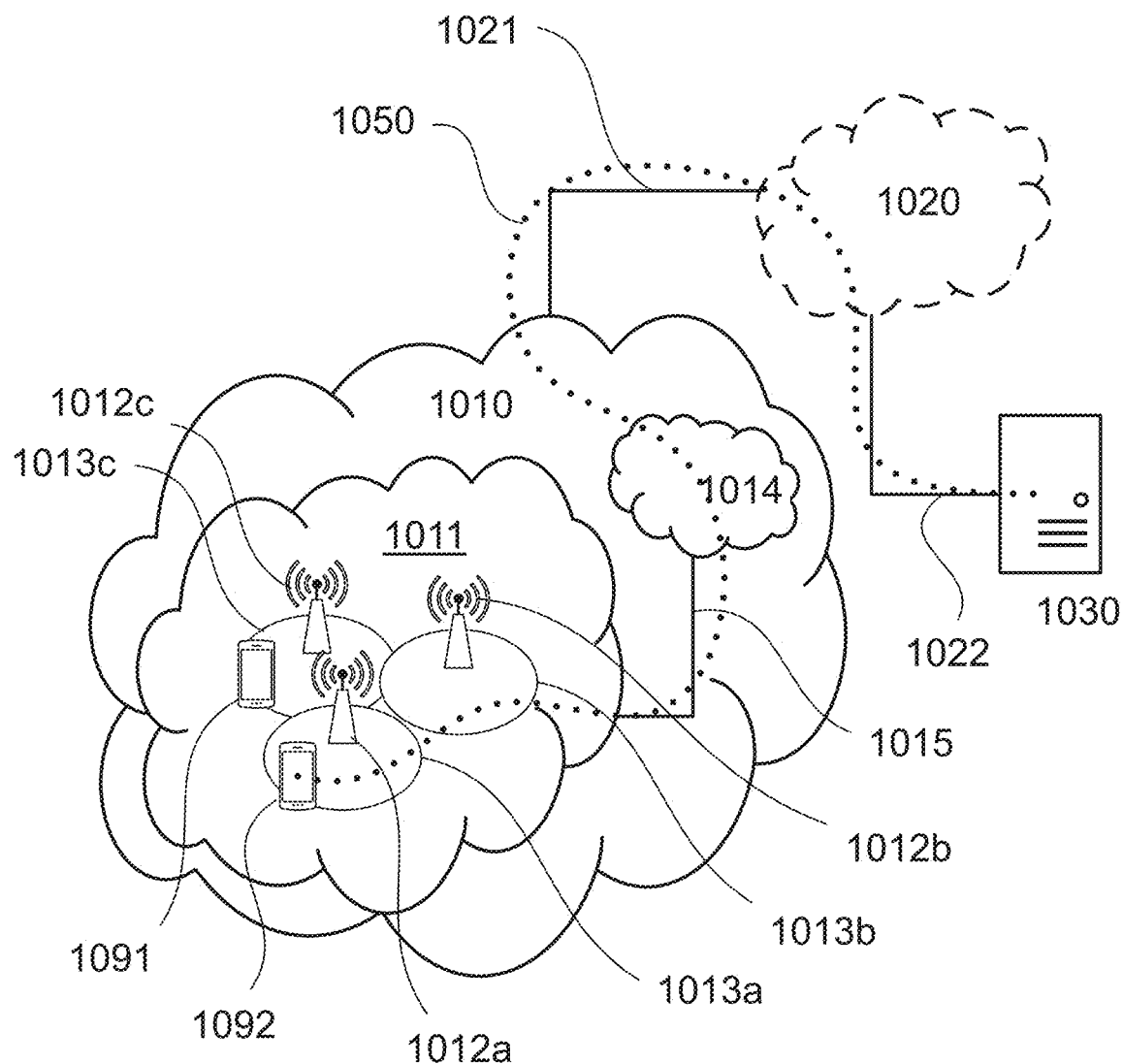
FIG. 10 illustrates a communication system, according to certain embodiments, according to certain embodiments.

FIG. 10 illustrates a communication system, according to certain embodiments. As depicted, the communication system includes a telecommunication network 1010, such as a 3GPP-type cellular network, which comprises an access network 1011, such as a radio access network, and a core network 1014. The access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to the core network 1014 over a wired or wireless connection 1015. A first user equipment (UE) 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

The telecommunication network 1010 is itself connected to a host computer 1030, which may be embodied in the hardware and/or software of a standalone server, a cloud-implemented server, a distributed server or as processing resources in a server farm. The host computer 1030 may be under the ownership or control of a service provider or may be operated by the service provider or on behalf of the service provider. The connections 1021, 1022 between the telecommunication network 1010 and the host computer 1030 may extend directly from the core network 1014 to the host computer 1030 or may go via an optional intermediate network 1020. The intermediate network 020 may be one of, or a combination of more than one of, a public, private or hosted network; the intermediate network 1020, if any, may be a backbone network or the Internet; in particular, the intermediate network 1020 may comprise two or more sub-networks (not shown).

The communication system of FIG. 10 as a whole enables connectivity between one of the connected UEs 1091, 1092 and the host computer 1030. The connectivity may be described as an over-the-top (OTT) connection 1050. The host computer 1030 and the connected UEs 1091, 1092 are configured to communicate data and/or signaling via the OTT connection 1050, using the access network 1011, the core network 1014, any intermediate network 1020 and possible further infrastructure (not shown) as intermediaries. The OTT connection 1050 may be transparent in the sense that the participating communication devices through which the OTT connection 1050 passes are unaware of routing of uplink and downlink communications. For example, a base station 1012 may not or need not be informed about the past routing of an incoming downlink communication with data originating from a host computer 1030 to be forwarded (e.g., handed over) to a connected UE 1091. Similarly, the base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In a communication system 1100, a host computer 1110 comprises hardware 1115 including a communication interface 1116 configured to set up and maintain a wired or wireless connection with an interface of a different communication device of the communication system 1100. The host computer 1110 further comprises processing circuitry 1118, which may have storage and/or processing capabilities. In particular, the processing circuitry 1118 may comprise one or more programmable processors, application-specific integrated circuits, field programmable gate arrays or combinations of these (not shown) adapted to execute instructions. The host computer 1110 further comprises software 1111, which is stored in or accessible by the host computer 1110 and executable by the processing circuitry 1118. The software 1111 includes a host application 1112. The host application 1112 may be operable to provide a service to a remote user, such as a UE 1130 connecting via an OTT connection 1150 terminating at the UE 1130 and the host computer 1110. In providing the service to the remote user, the host application 1112 may provide user data which is transmitted using the OTT connection 1150.

The communication system 1100 further includes a base station 1120 provided in a telecommunication system and comprising hardware 1125 enabling it to communicate with the host computer 1110 and with the UE 1130. The hardware 1125 may include a communication interface 1126 for setting up and maintaining a wired or wireless connection with an interface of a different communication device of the communication system 1100, as well as a radio interface 1127 for setting up and maintaining at least a wireless connection 1170 with a UE 1130 located in a coverage area (not shown in FIG. 6) served by the base station 1120. The communication interface 1126 may be configured to facilitate a connection 1160 to the host computer 1110. The connection 1160 may be direct or it may pass through a core network (not shown in FIG. 6) of the telecommunication system and/or through one or more intermediate networks outside the telecommunication system. In the embodiment shown, the hardware 1125 of the base station 1120 further includes processing circuitry 1128, which may comprise one or more programmable processors, application-specific integrated circuits, field programmable gate arrays or combinations of these (not shown) adapted to execute instructions. The base station 1120 further has software 1121 stored internally or accessible via an external connection.

The communication system 1100 further includes the UE 1130 already referred to. Its hardware 1135 may include a radio interface 1137 configured to set up and maintain a wireless connection 1170 with a base station serving a coverage area in which the UE 1130 is currently located. The hardware 1135 of the UE 1130 further includes processing circuitry 1138, which may comprise one or more programmable processors, application-specific integrated circuits, field programmable gate arrays or combinations of these (not shown) adapted to execute instructions. The UE 1130 further comprises software 1131, which is stored in or accessible by the UE 1130 and executable by the processing circuitry 1138. The software 1131 includes a client application 1132. The client application 1132 may be operable to provide a service to a human or non-human user via the UE 1130, with the support of the host computer 1110. In the host computer 1110, an executing host application 1112 may communicate with the executing client application 1132 via the OTT connection 1150 terminating at the UE 1130 and the host computer 1110. In providing the service to the user, the client application 1132 may receive request data from the host application 1112 and provide user data in response to the request data. The OTT connection 1150 may transfer both the request data and the user data. The client application 1132 may interact with the user to generate the user data that it provides.

Figure 11:
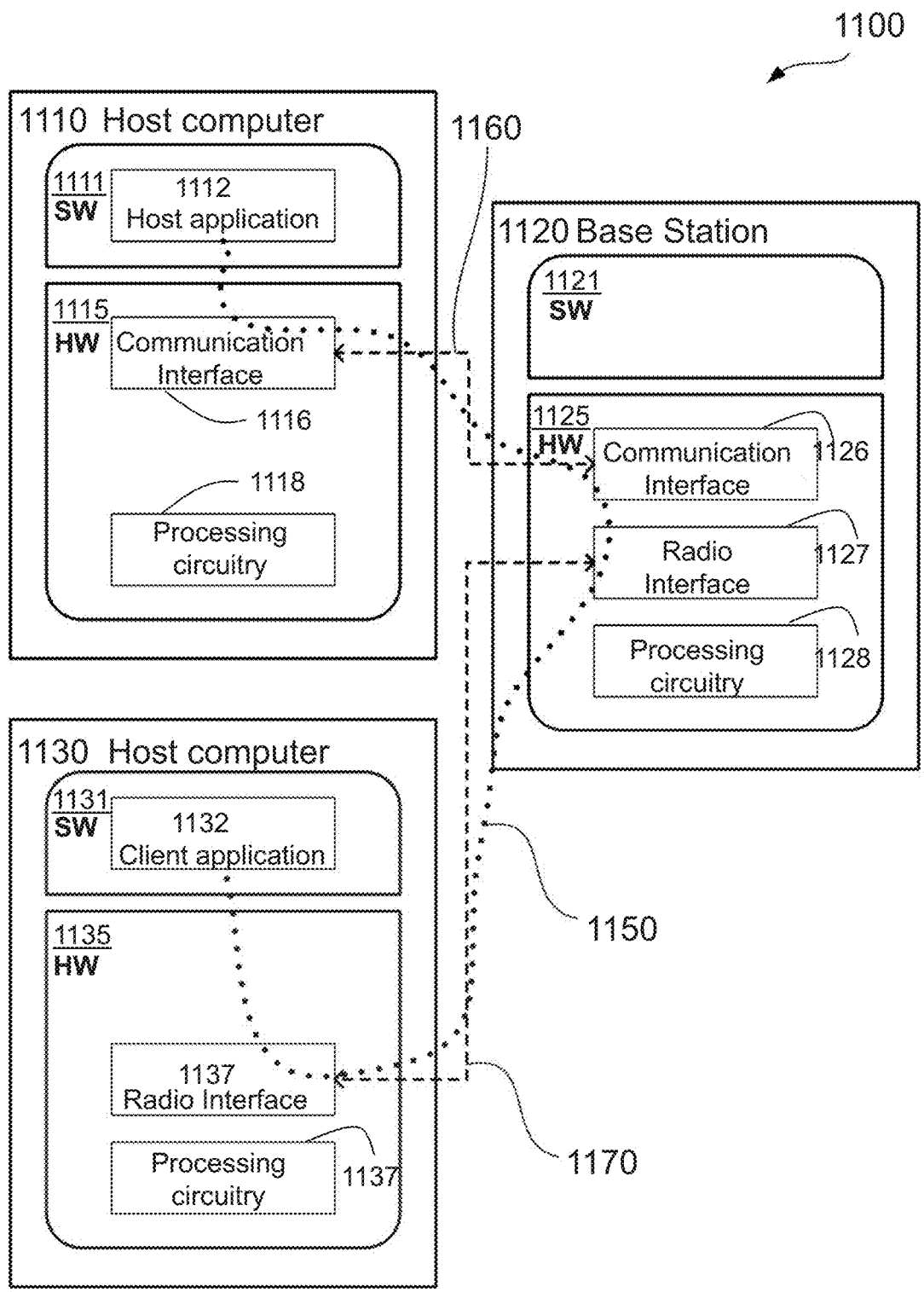
FIG. 11 illustrates a host computer communicating via a base station with a user equipment over a partially wireless connection, according to certain embodiments.

It is noted that the host computer 1110, base station 1120 and UE 1130 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 1150 has been drawn abstractly to illustrate the communication between the host computer 1110 and the use equipment 1130 via the base station 1120, without explicit reference to any intermediary devices and the precise routing of messages via these devices. Network infrastructure may determine the routing, which it may be configured to hide from the UE 1130 or from the service provider operating the host computer 1110, or both. While the OTT connection 1150 is active, the network infrastructure may further take decisions by which it dynamically changes the routing (e.g., on the basis of load balancing consideration or reconfiguration of the network).

The wireless connection 1170 between the UE 1130 and the base station 1120 is in accordance with the teachings of the embodiments described throughout this disclosure. One or more of the various embodiments improve the performance of OTT services provided to the UE 1130 using the OTT connection 1150, in which the wireless connection 1170 forms the last segment. More precisely, the teachings of these embodiments may improve the determination of which logical channels are served, and thereby provide benefits such as improved quality of service.

A measurement procedure may be provided for the purpose of monitoring data rate, latency and other factors on which the one or more embodiments improve. There may further be an optional network functionality for reconfiguring the OTT connection 1150 between the host computer 1110 and UE 1130, in response to variations in the measurement results. The measurement procedure and/or the network functionality for reconfiguring the OTT connection 1150 may be implemented in the software 1111 of the host computer 1110 or in the software 1131 of the UE 1130, or both. In embodiments, sensors (not shown) may be deployed in or in association with communication devices through which the OTT connection 1150 passes; the sensors may participate in the measurement procedure by supplying values of the monitored quantities exemplified above or supplying values of other physical quantities from which software 1111, 1131 may compute or estimate the monitored quantities. The reconfiguring of the OTT connection 1150 may include message format, retransmission settings, preferred routing etc.; the reconfiguring need not affect the base station 1120, and it may be unknown or imperceptible to the base station 1120. Such procedures and functionalities may be known and practiced in the art. In certain embodiments, measurements may involve proprietary UE signaling facilitating the host computer's 1110 measurements of throughput, propagation times, latency and the like. The measurements may be implemented in that the software 1111, 1131 causes messages to be transmitted, in particular empty or 'dummy' messages, using the OTT connection 1150 while it monitors propagation times, errors etc.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In an optional first step 1210 of the method, the UE receives input data provided by the host computer. Additionally, or alternatively, in an optional second step 1220, the UE provides user data. In an optional substep 1225 of the second step 1220, the UE provides the user data by executing a client application. In a further optional substep 1215 of the first step 1210, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1230, transmission of the user data to the host computer. In a fourth step 1240 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In an optional first step 1310 of the method, in accordance with the teachings of the embodiments described throughout this disclosure, the base station receives user data from the UE. In an optional second step 1320, the base station initiates transmission of the received user data to the host computer. In a third step 1330, the host computer receives the user data carried in the transmission initiated by the base station.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method performed by a user equipment (UE), the method comprising:
   receiving, from a network node, a logical channel configuration, the logical channel configuration comprising a channel-specific priority, the channel-specific priority associated with a logical channel configured by the logical channel configuration;
   receiving, from the network node, a dynamic grant that includes a physical layer configuration for a transmission by the UE and a priority level, wherein the physical layer configuration together with the priority level provide a transmission profile for serving one or more logical channels; and serving the logical channel configured by the logical channel configuration according to the physical layer configuration of the dynamic grant based on mapping the priority level in the dynamic grant to the channel-specific priority associated with the logical channel configured by the logical channel configuration.

2. The method of claim 1, wherein the transmission by the UE comprises an uplink transmission from the UE to a network node.

3. The method of claim 1, wherein serving the logical channel comprises:

for the transmission by the UE, serving the logical channel configured by the logical channel configuration according to the physical layer configuration based on the dynamic grant that includes the physical layer configuration and the priority level that maps to the channel-specific priority associated with the logical channel configured by the logical channel configuration; and for another transmission by the UE, serving the logical channel configured by the logical channel configuration according to another physical layer configuration based on another dynamic grant that includes said other physical layer configuration and a priority level for said other physical layer configuration that maps to the channel-specific priority associated with the logical channel configured by the logical channel configuration.

4. The method of claim 1, wherein the physical layer configuration comprises a configuration for one or more of:

a transmission power;
a power boosting;
a duration of the transmission;
a subcarrier spacing;
a modulation-and-coding scheme; or
a set of resource blocks to transmit upon.

5. A wireless device, comprising:

processing circuitry, the processing circuitry operable to:

receive, from a network node, a logical channel configuration, the logical channel configuration comprising a channel-specific priority, the channel-specific priority associated with a logical channel configured by the logical channel configuration;

receive, from the network node, a dynamic grant that includes a physical layer configuration for a transmission by the UE and a priority level, wherein the physical layer configuration together with the priority level provide a transmission profile for serving one or more logical channels; and serve the logical channel configured by the logical channel configuration according to the physical layer configuration of the dynamic grant based on mapping the priority level in the dynamic grant to the channel-specific priority associated with the logical channel configured by the logical channel configuration.

6. The wireless device of claim 5, wherein the transmission by the wireless device comprises an uplink transmission from the wireless device to a network node.

7. The wireless device of claim 5, wherein to serve the logical channel the processing circuitry is operable to:

for the transmission by the UE, serve the logical channel configured by the logical channel configuration according to the physical layer configuration based on the dynamic grant that includes the physical layer configuration and the priority level that maps to the channel-specific priority associated with the logical channel configured by the logical channel configuration; and for another transmission by the UE, serve the logical channel configured by the logical channel configuration according to another physical layer configuration based on another dynamic grant that includes said other physical layer configuration and a priority level for said other physical layer configuration that maps to the channel-specific priority associated with the logical channel configured by the logical channel configuration.

8. The wireless device of claim 5, wherein the physical layer configuration comprises a configuration for one or more of:

a transmission power;
a power boosting;
a duration of the transmission;
a subcarrier spacing;
a modulation-and-coding scheme; or
a set of resource blocks to transmit upon.

* * * * *